US012583479B2

(12) United States Patent
Zarringhalam et al.

(10) Patent No.: US 12,583,479 B2
(45) Date of Patent: Mar. 24, 2026

(54) VEHICLE TRAJECTORY CONTROL FOR PRECISE ROUTE FOLLOWING

(71) Applicant: GM GLOBAL TECHNOLOGY OPERATIONS LLC, Detroit, MI (US)

(72) Inventors: Reza Zarringhalam, Whitby (CA); Mohammadali Shahriari, Markham (CA); Paul A. Adam, Milford, MI (US); Amirreza Mirbeygi Moghaddam, Toronto (CA); Shiva Ghasemi Dehkordi, Toronto (CA); Peitong Hu, Markham (CA)

(73) Assignee: GM Global Technology Operations LLC, Detroit, MI (US)

( * ) Notice: Subject to any disclaimer, the term of this patent is extended or adjusted under 35 U.S.C. 154(b) by 147 days.

(21) Appl. No.: 18/596,823

(22) Filed: Mar. 6, 2024

(65) Prior Publication Data

US 2025/0282387 A1 Sep. 11, 2025

(51) Int. Cl.
 *B60W 60/00* (2020.01)
 *B60W 10/20* (2006.01)
 *B60W 30/182* (2020.01)
(52) U.S. Cl.
 CPC ........ *B60W 60/0016* (2020.02); *B60W 10/20* (2013.01); *B60W 30/182* (2013.01); *B60W 2510/20* (2013.01)
(58) Field of Classification Search
 CPC ............. B60W 60/0016; B60W 10/20; B60W 30/182; B60W 2510/20
 See application file for complete search history.

(56) References Cited

U.S. PATENT DOCUMENTS

| | | | | |
|---|---|---|---|---|
| 2013/0253770 A1* | 9/2013 | Nishikawa | .......... | B60W 50/023 701/1 |
| 2013/0304322 A1* | 11/2013 | Isaji | ......................... | B62D 6/00 701/41 |
| 2015/0334768 A1* | 11/2015 | Ranasinghe | ........... | G06V 10/84 370/328 |
| 2017/0197618 A1* | 7/2017 | Ali | .................... | B60W 60/0016 |

(Continued)

FOREIGN PATENT DOCUMENTS

| | | | | |
|---|---|---|---|---|
| CN | 111132258 A | * | 5/2020 | ............ H04W 40/22 |
| DE | 102013207572 A1 | | 11/2013 | |

(Continued)

*Primary Examiner* — Redhwan K Mawari
(74) *Attorney, Agent, or Firm* — Quinn IP Law

(57) ABSTRACT

A method for controlling a vehicle through one or more controllers includes determining an intended driving path of the vehicle. The method further includes determining locations of virtual attracting nodes on or generally on the intended driving path. Additionally, the method includes determining locations of virtual repelling nodes along one or more boundaries spaced from the intended driving path or located at obstacles near the intended driving path. The method additionally includes calculating virtual attractive forces between one or more positions of the vehicle and the virtual attracting nodes. In addition, the method includes calculating virtual repelling forces between one or more positions of the vehicle and the virtual repelling nodes. The method additionally includes controlling a trajectory of the vehicle at least in part using the virtual attractive forces and the virtual repelling forces.

20 Claims, 5 Drawing Sheets

(56) References Cited

U.S. PATENT DOCUMENTS

| 2017/0248959 A1 * | 8/2017 | Matsubara ...... B60W 30/18163 |
| 2023/0084461 A1 * | 3/2023 | Koehler ............. B60W 60/001 |
| | | 701/23 |
| 2023/0331218 A1 * | 10/2023 | Choi .................... B60W 10/20 |
| 2025/0206311 A1 * | 6/2025 | Gemeinhardt .. B60W 30/18018 |

FOREIGN PATENT DOCUMENTS

| DE | 102016205442 A1 | 10/2017 |
| DE | 102021212648 A1 | 6/2022 |

* cited by examiner

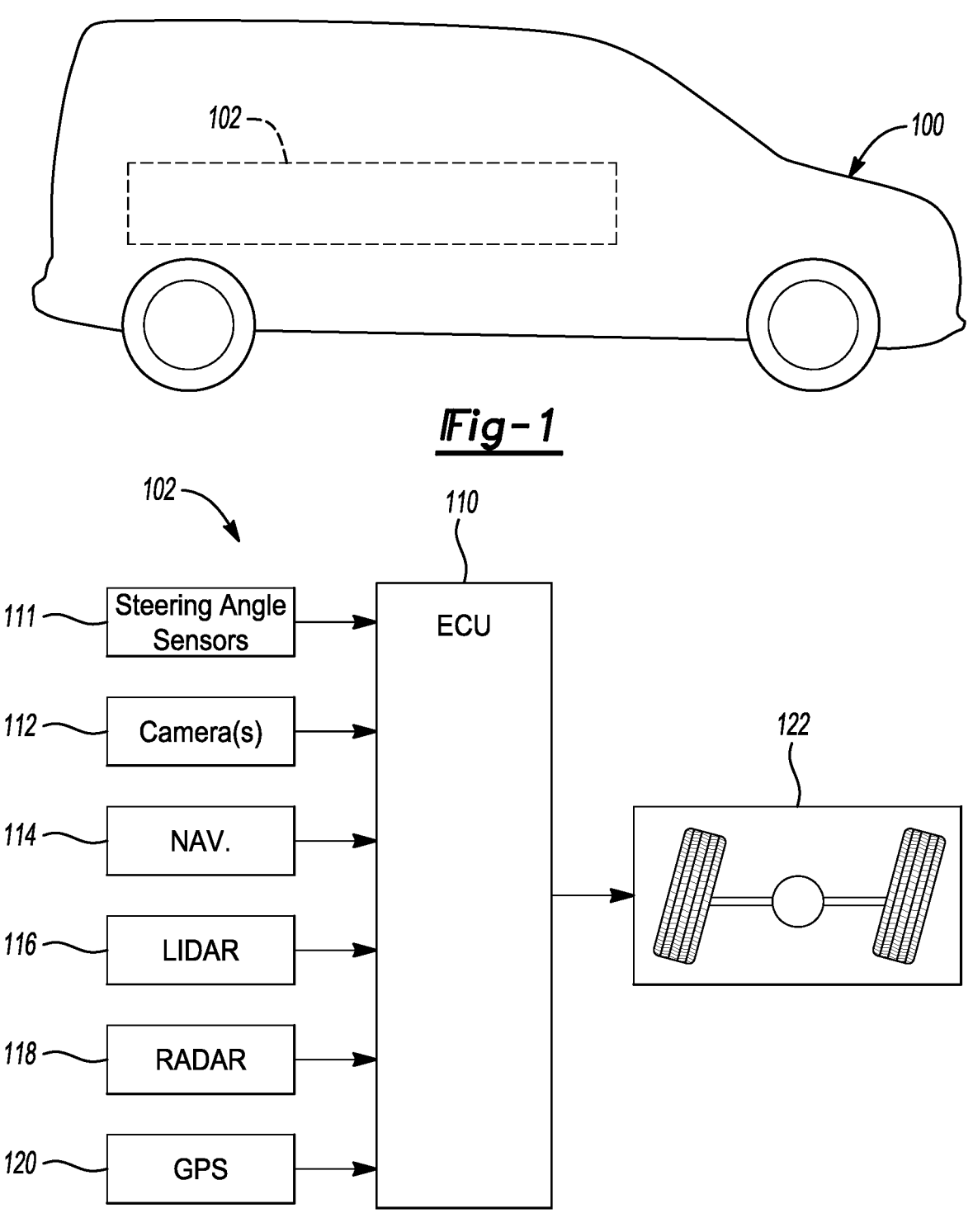
_Fig-1_
_Fig-2_

212

$$u_{min}(k,i) \leq u(k,i) \leq u_{max}(k,i), \forall i \leq n_u$$

$$\Delta u_{min}(k,i) \leq u(k,i) - u(k-1,i) \leq \Delta u_{max}(k,i), \forall i \leq n_u$$

$$y_{min}(k,j) - Amin(j) \epsilon(k,j) \leq y(k,j) \leq y_{max}(k,j) + Amax(j) \epsilon(k,j), \forall j \leq n_p$$

*Fig-3A*

$$B_L = (1-t)^3 R_1^L + 3t(1-t)^2 R_2^L + 3t^2(1-t) R_3^L + t^4 R_4^L \longrightarrow (1)$$

$$B_R = (1-t)^5 R_1^R + 5t(1-t)^4 R_2^R + 10t^2(1-t)^3 R_3^R + 10t^3(1-t)^2 R_4^R + 5t^4(1-t) R_5^R + t^5 R_6^R \longrightarrow (2)$$

$$B_T = (1-t)^5 A_1^T + 5t(1-t)^4 A_2^T + 10t^2(1-t)^3 A_3^T + 10t^3(1-t)^2 A_4^T + 5t^4(1-t) A_5^T + t^5 A_6^T \longrightarrow (3)$$

VEHICLE TRAJECTORY CONTROL FOR PRECISE ROUTE FOLLOWING

INTRODUCTION

This disclosure is in the field of vehicle trajectory control.

A system to help provide reliable trajectory control in autonomous or semi-autonomous vehicles may be advantageous.

SUMMARY

A method for controlling a vehicle through one or more controllers includes determining an intended driving path of the vehicle. The method further includes determining locations of virtual attracting nodes on the intended driving path. Additionally, the method includes determining locations of virtual repelling nodes along one or more boundaries spaced from the intended driving path or located at obstacles near the intended driving path. The method additionally includes calculating virtual attractive forces between one or more positions of the vehicle and the virtual attracting nodes. In addition, the method includes calculating virtual repelling forces between one or more positions of the vehicle and the virtual repelling nodes. The method additionally includes controlling a trajectory of the vehicle at least in part using the virtual attractive forces and the virtual repelling forces.

The method may also include assigning different weights to different virtual attracting nodes, the different weights representing different virtual attractive forces generated by the different virtual attracting nodes. Further, the method may include assigning different weights to different virtual repelling nodes, the different weights representing different virtual repelling forces generated by the different virtual repelling nodes. At least some of the virtual repelling nodes may be constructed as circles, radii of the circles representing the weights of the at least some virtual repelling nodes. At least some of the virtual repelling nodes that are constructed as circles may be located at obstacles for the vehicle to avoid.

The method may yet further include using the virtual attractive forces and the virtual repelling forces to determine a cost, where controlling a trajectory of the vehicle further includes using the cost in a model predictive controller that controls the trajectory of the vehicle.

The method may also include controlling the trajectory of the vehicle using a Comfort Mode and a Precision Mode, each of Comfort Mode and Precision Mode using control points, where in Precision Mode, a larger number of control points is used than in Comfort Mode. Precision Mode may be used in areas of an impending steering maneuver of the vehicle, an impending road intersection, an impending road ramp, a construction zone, or relatively high traffic.

A second method for controlling a vehicle through one or more controllers includes determining an intended driving path of the vehicle. The method further includes determining locations of first virtual repelling nodes along a first boundary spaced from the intended driving path and determining locations of second virtual repelling nodes along a second boundary spaced from the intended driving path. The method additionally includes using at least some of the first virtual repelling nodes to generate a first virtual repelling curve and using at least some of the second virtual repelling nodes to generate a second virtual repelling curve. Further yet, the method includes calculating first virtual repelling forces between one or more positions of the vehicle and the first virtual repelling curve and calculating second virtual repelling forces between one or more positions of the vehicle and the second virtual repelling curve. In addition, the method includes steering the vehicle at least in part using the first virtual repelling forces and the second virtual repelling forces.

The second method may further include determining locations of virtual attracting nodes located along or generally along the intended driving path, using at least some of the virtual attracting nodes to generate a virtual attracting curve and generating virtual attractive forces between one or more positions of the vehicle and the virtual attracting curve. The method may also include steering the vehicle at least in part using the virtual attractive forces, the first virtual repelling forces, and the second virtual repelling forces. The virtual attracting and repelling curves may be Bezier curves.

The second method for controlling a vehicle may include steering the vehicle using a Comfort Mode and a Precision Mode, wherein in Precision Mode, the first virtual repelling curve and the second virtual repelling curve are located more closely together than in Comfort Mode. Precision mode may be used in areas of an impending steering maneuver of the vehicle, an impending road intersection, an impending road ramp, a construction zone, or relatively high traffic.

A vehicle includes one or more steered wheels and one or more electronic controllers adapted to control the steered wheels. The one or more controllers are collectively programmed with the following instructions: determine an intended driving path of the vehicle; determine locations of virtual attracting nodes along the intended driving path; determine locations of virtual repelling nodes along one or more boundaries spaced from the intended driving path or located at obstacles near the intended driving path; calculate virtual attractive forces between one or more positions of the vehicle and the virtual attracting nodes; calculate virtual repelling forces between one or more positions of the vehicle and the virtual repelling nodes; and control the steered wheels at least in part using the virtual attractive forces and the virtual repelling forces.

The vehicle may also include one or more controllers collectively programmed with an instruction to assign different weights to different virtual attracting nodes, the different weights representing different virtual attractive force generated by the different virtual attracting nodes. The vehicle may also contain one or more controllers collectively programmed to assign different weights to different virtual repelling nodes, the different weights representing different virtual repelling force generated by the different virtual repelling nodes.

In the vehicle, at least some of the virtual repelling nodes may be located on circles, the radii of the circles representing the weights of the at least some virtual repelling nodes. The vehicle may also include one or more controllers collectively programmed to use the virtual attractive forces and the virtual repelling forces to determine a cost, where the instruction to control the steered wheels further includes an instruction to use the cost in a model predictive controller that controls the steered wheels of the vehicle.

Asymmetric error constraints may be provided (for example, a comfort trajectory on one side of an intended vehicle path and a precision trajectory on the other side of the intended vehicle path).

Path planning commands may be provided that, in addition to a nominal desired trajectory, include asymmetric error constraints as well as comfort and precision command and transition commands between the comfort and precision commands. The control system may follow a desired trajectory of the vehicle and adapt its behavior to factor in the additional planner commands.

The above summary does not represent every embodiment or every aspect of this disclosure. The above-noted features and advantages of the present disclosure, as well as other possible features and advantages, will be readily apparent from the following detailed description of the embodiments and best modes for carrying out the disclosure when taken in connection with the accompanying drawings and appended claims. Moreover, this disclosure expressly includes combinations and sub-combinations of the elements and features presented above and below.

BRIEF DESCRIPTION OF THE DRAWINGS

FIG. 1 illustrates a vehicle having a steering system.

FIG. 2 illustrates a portion of the steering system of the vehicle.

FIG. 3A shows in detail some constraints that are used in the control method illustrated in FIG. 3.

DETAILED DESCRIPTION

Figure 3:
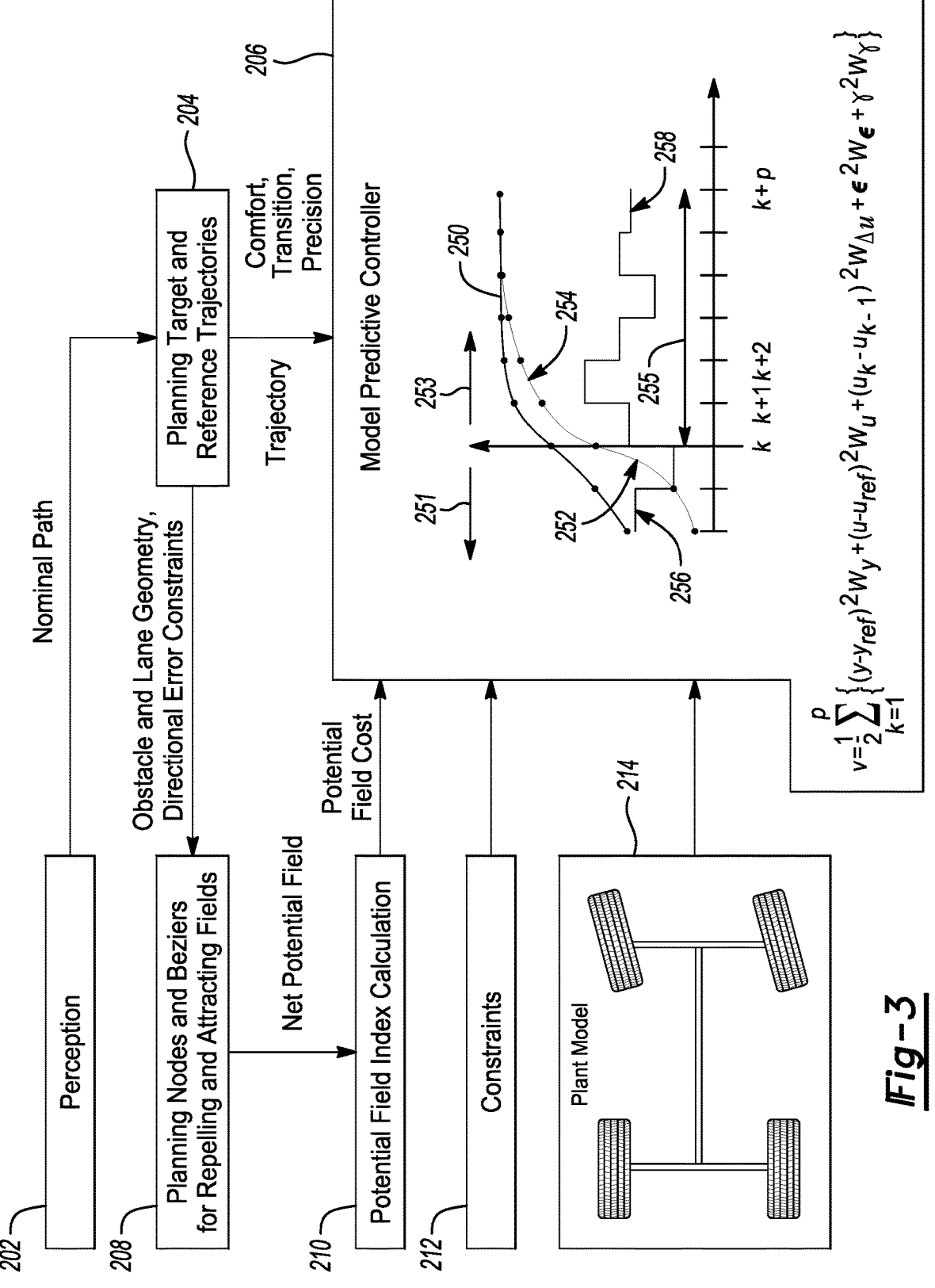
FIG. 3 illustrates a method for controlling the trajectory of the vehicle.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Refer first to FIG. 1. Illustrated there is a vehicle 100. Vehicle 100 may be an autonomously- or semiautonomously-driven vehicle, where steering and route planning are performed at least in part without human intervention or with limited human intervention. Vehicle 100 may be any style of vehicle, such as a car, truck, van, sport-utility vehicle, or other vehicle. Referring also to FIG. 2, vehicle 100 has a steering control system 102.

Steering control system 102 may include one or more electronic control units (ECUs), such as ECU 110. ECU 110 may be a microprocessor-based controller and should be understood to have the electronic resources (microcontroller, software, memory, inputs, outputs, circuitry, and the like) to perform the functions ascribed to ECU 110 in this disclosure. The functions described in this disclosure may also be distributed among one or more electronic control units in vehicle 100, which may be networked together by data buses and/or hard wiring, and therefore may share data and may share computing responsibility.

As ECU 110 and other controllers on vehicle 100 may be microprocessor-based devices, they may operate based on instructions; such instructions may include one or more programmed software commands. Further, some or all such instructions may include additional instructions.

Inputs to ECU 110 may include one or more steering angle sensors 111. Steering angle sensor(s) 111 may provide the angles of the steered wheels of vehicle 100. Vehicle 100 may have one or more steered wheels. Vehicle 100 may have two steered wheels. Vehicle 100 may also have more than two steered wheels, such as four steered wheels.

Inputs to ECU 110 may also include the output of a navigation system 114. Navigation system 114 may carry mapping data so as to know the configurations and locations of roads, including their boundaries, lane demarcations, and intersections. Navigation system 114 may also contain a desired target or destination for vehicle 100 and one or more nominal paths for vehicle 100 to reach the target.

Additionally, inputs to ECU 110 may include perception sensors such as one or more cameras 112, light detection and ranging (LIDAR) remote sensing 116, radar 118, and global positioning satellite (GPS) sensing 120. Such perception sensors may provide ECU 110 with an indication of the environment around vehicle 100. Such environment may include the current position of vehicle 100. The environment may include visual or otherwise perceptible indications of other vehicles or of obstacles in the vicinity of vehicle 100. The environment may also include road lane markings, guard rails, road edges, intersections, impediments, and other features of the roadways on which vehicle 100 may travel.

An output from ECU 110 may include one or more actuators 122 for controlling the steered wheels of vehicle 100. As such, ECU 100 is adapted to control the steered wheels of vehicle 100 in order to steer or control the trajectory of vehicle 100. Vehicle 100 may have one or more steered wheels. Vehicle 100 may have two steered wheels. Vehicle 100 may have four steered wheels.

Referring additionally to FIG. 3, a block diagram of a system and method for controlling a vehicle's trajectory according to this example disclosure is shown. Block 202 is a perception block. There, the position and surroundings of vehicle 100 may be sensed, such as through perception sensors (camera(s) 112, LIDAR remote sensing 116, radar 118, and GPS 120) and/or through navigation system 114. The output of block 202 may be a nominal, or intended, path of vehicle 100 to get to the target destination of vehicle 100. At block 204, reference trajectories to get to the target destination may be calculated. Multiple reference trajectories may be calculated, such as comfort, transition, and precision trajectories. As will be described in further detail, a comfort trajectory may be used where precise control of the steering or trajectory of vehicle 100 is not viewed to be needed. This may be, for instance, along a generally straight section of roadway without nearby intersections, without nearby exit or entrance ramps, and without nearby obstructions. (When a comfort trajectory is employed, this disclosure may refer to the control system of vehicle 100 as being in Comfort Mode.) On the other hand, a precision trajectory may be used where precise control may be more important. This may be, for instance, in areas of roadway with intersections, exit or entrance ramps, road lane restrictions, or nearby obstructions. (When a precision trajectory is employed, this disclosure may refer to the control system of vehicle 100 as being in Precision Mode.) A transition trajectory may be for a situation where the roadway transitions between areas where comfort trajectory and precision trajectory may be desirable. (When a transition trajectory is employed, this disclosure may refer to the control system of vehicle 100 as being in Transition Mode.) In Comfort Mode, control may be performed with fewer control points, with relaxed boundaries, and/or with a lesser bandwidth than in Precision Mode, in order to make the control of the steering of vehicle 100 less "harsh" feeling.

At block 214, a model of the "plant" being controlled, namely vehicle 100 and its steering system, is provided to Model Predictive Controller 206.

A selected trajectory from block 204 may be fed to a Model Predictive Controller 206. Model Predictive Controller 206 may be within ECU 110, within another controller in vehicle 100, or shared among multiple controllers that may be networked together. Model Predictive Controller 206 will work to provide a control input to actuators 122 in order to cause vehicle 100 to follow the desired trajectory. Model Predictive Controller 206 will test various possible input sequences (in this case, steering inputs to be provided via actuators 122) for the one that will cause the output to approach the reference trajectory will the smallest cost V over a prediction horizon with "p" steps of predictions into the future. Model Predictive Controller 206 will then command the first element of the optimal input sequence ($u_k$) to steer the vehicle. Model Predictive Controller 206 will then do the calculation again at the next time interval for the digital control. The calculation of cost V will be described in more detail hereinafter.

Model Predictive Controller 206 also takes advantage of other inputs, the generation of which will now be discussed. Firstly, once the planning target and reference trajectories are provided at block 204, obstacle and lane geometry and directional error constraints may be provided from block 204 to block 208. At block 208, planning nodes and Bezier curves may be applied by ECU 100.

Figure 4:
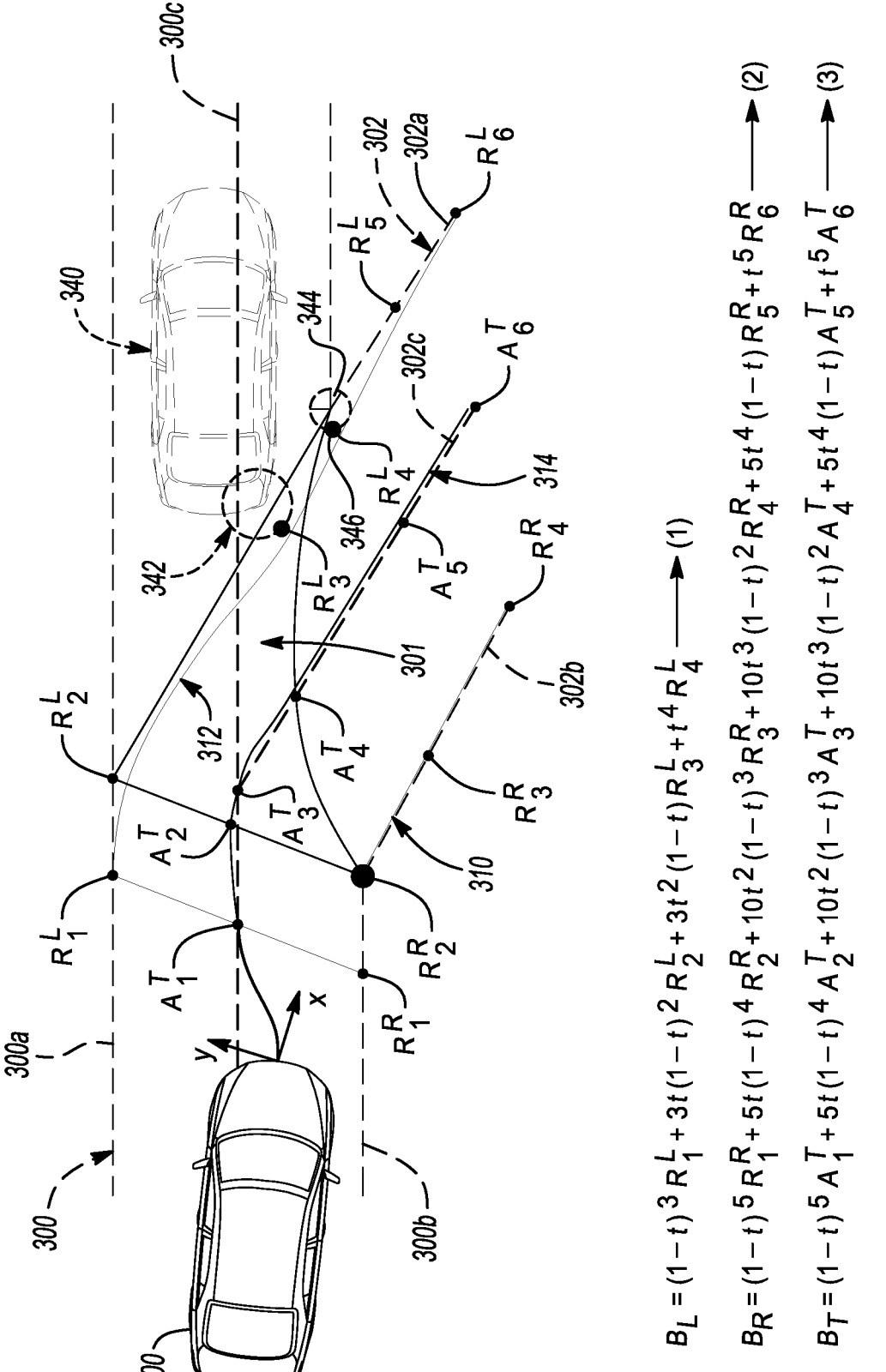
FIG. 4 illustrates control of the vehicle's trajectory as the vehicle traverses a fork or off ramp in the roadway.

Refer now to FIG. 4. The planning nodes applied at block 208 may be either virtual attracting or virtual repelling nodes. Consider in FIG. 4 that vehicle 100 may be transitioning from travelling on a straight roadway 300 through a fork 301 to travel on another roadway 302. Roadway 300 may include a first boundary, such as left edge 300a and a second boundary, such as right edge 300b. Roadway 302 may include a first boundary, such as left edge 302a and a second boundary, such as right edge 302b. One or more virtual attracting nodes may be placed along the path (say, for example, along the center 300c of roadway 300 and turning onto the center 302c of roadway 302) where vehicle 100 is intended to travel. Such virtual attracting nodes may include virtual attracting node $A_1^T$, virtual attracting node $A_2^T$, virtual attracting node $A_3^T$, virtual attracting node $A_4^T$, virtual attracting node $A_5^T$, and virtual attracting node $A_6^T$. A purpose of the virtual attracting nodes is to create virtual "fields" that effectively act to "attract" vehicle 100 in the calculation of the cost function V illustrated in Model Predictive Controller 206 of FIG. 3. Such attraction acts to help cause the control of vehicle 100 to track its intended path. The virtual attracting nodes may be on or generally on the intended driving path of vehicle 100.

The planning nodes applied at block 208 may also be virtual repelling nodes. Such virtual repelling nodes may include virtual repelling node $R_1^R$, virtual repelling node $R_2^R$, virtual repelling node $R_3^R$, and virtual repelling node $R_4^R$, each located spaced away from the intended path of vehicle 100. In this case, they are spaced to the right of the intended path and may be located along the right edges of the respective roadways 300 and 302. Alternatively, the virtual repelling nodes may be located along an edge of a lane demarcation, such as a road lane marker between two lanes, in the roadway.

Additional virtual repelling nodes may also be provided, such as virtual repelling node $R_1^L$, virtual repelling node $R_2^L$, virtual repelling node $R_5^L$, and virtual repelling node $R_6^L$, each located spaced away from the intended path of vehicle 100. In this case, they are spaced to the left of the intended path and may be located along the left edges of the respective roadways 300 and 302. Alternatively, the virtual repelling nodes may be located along the edge of a lane dividing demarcation in the respective roadway.

Bezier curves may also be drawn by ECU 110, defined by the respective virtual attracting and virtual repelling nodes. For instance, Bezier curve 312, which may be generally along the left edge 300a of roadway 300 and transition to the left edge 302a of roadway 302, may be described by parametric equation (1) for $B_L$ specified in FIG. 4. Further, Bezier curve 310, which may be generally along the right edge 300b of roadway 300 and transition to the right edge 302b of roadway 302, may be described by parametric equation (2) for $B_R$ specified in FIG. 4. It is therefore apparent that Bezier curve 310 and Bezier curve 312 may be constructed from virtual repelling nodes.

Bezier curve 314 may also be drawn by ECU 110. Bezier curve 314 may be generally along the center 300c of roadway 300 (which may be on or generally on the target trajectory for vehicle 100) and transition to the center 302c of roadway 302 (which may also be on or generally on the target trajectory for vehicle 100 as vehicle 100 traverses the fork 301 between roadway 300 and roadway 302). Bezier curve 314 may be described by parametric equation (3) for $B_T$ shown in FIG. 4.

The perception sensors on vehicle 100 may also recognize at block 202 (FIG. 3) that an obstacle or potential obstacle (here, second vehicle 340) is ahead of vehicle 100. ECU 110 may place a virtual repelling node Ry on or near second vehicle 340, namely in this example near the right rear corner of second vehicle 340. Virtual repelling node Ry may be constructed as a circle 342. Virtual repelling node Ry may face vehicle 100. Circle 342 may have a radius that represents the strength of the repelling node, which may reflect the significance of the potential obstacle at issue. That is, if an obstacle or potential obstacle is viewed as more significant, virtual repelling node R may be placed further away (in this case, on a larger circle 342) from the obstacle in order to help vehicle 100 keep a greater distance therefrom. The radius of the circle may also reflect an uncertainty as to the location of the obstacle; if the obstacle is a moving vehicle, a larger radius may be assigned due to some uncertainty as to the ongoing position of the obstacle. A smaller radius may be used where the obstacle is fixed, due to more certainty as to the obstacle's position.

A virtual repelling node $R_4^L$ may be placed at the apex 344 of the intersection between roadway 300 and 302. Again, apex 344 may be an especially significant location that vehicle 100 wishes to avoid. Virtual repelling node $R_4^L$ may be constructed as a circle 346 that has a radius that represents the strength of the repelling node, which may be proportional to or otherwise directly related to the significance of the location that vehicle 100 wishes to avoid. Virtual repelling node $R_4{}^L$ may face toward or generally toward vehicle 100.

Figures 5, 6:
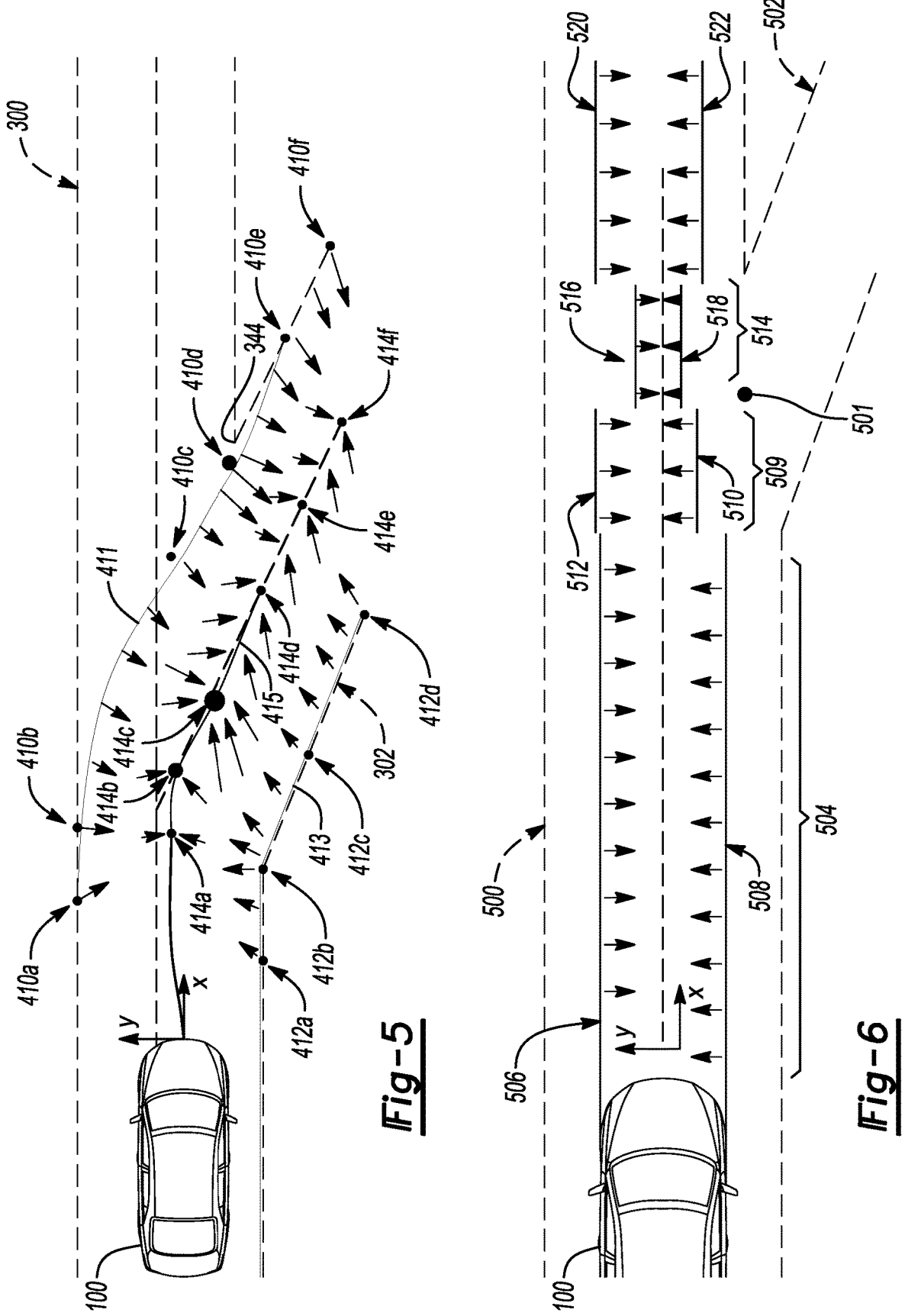
FIG. 5 additionally illustrates control of the vehicle's trajectory as the vehicle traverses a fork or off ramp in the roadway.
FIG. 6 illustrates an example of a Comfort Mode, a Transition Mode, and a Precision Mode for control of the trajectory of the vehicle.

Refer additionally to FIG. 5. There, virtual repelling node 410*a*, virtual repelling node 410*b*, virtual repelling node 410*c*, virtual repelling node 410*d*, virtual repelling node 410*e*, and virtual repelling node 410*f* are illustrated. (These virtual repelling nodes may be collectively referred to as virtual repelling nodes 410*a*-410*f*.) Furthermore, virtual repelling node 412*a*, virtual repelling node 412*b*, virtual repelling node 412*c* and virtual repelling node 412*d* are illustrated. (These virtual repelling nodes may be collectively referred to as virtual repelling nodes 412*a*-412*d*.) Furthermore, virtual attracting node 414*a*, virtual attracting node 414*b*, virtual attracting node 414*c*, virtual attracting node 414*d*, virtual attracting node 414*e*, and virtual attracting node 414*f* are illustrated. (These virtual attracting nodes may be collectively referred to as virtual attracting nodes 414*a*-414*f*.) The virtual attracting and virtual repelling nodes may have different weights, depending at least in part on the significance of their locations along the intended path of vehicle 100. For example, virtual attracting node 414*c* is located immediately at the intersection of roadway 300 and roadway 302, which may be a particularly important point in the guidance and control of vehicle 100. Virtual attracting node 414*c* is represented in the figure with a larger radius, indicative of the larger relative weight it carries in calculating the virtual attractive force exerted on vehicle 100. Virtual attracting node 410*b* may have a larger weight due to the significance of its location at the beginning of the intersection between roadway 300 and roadway 302. Virtual repelling node 410*d* may similarly have a larger weight due to its heightened significance as being located at the apex 344; keeping a reasonable distance from apex 344 may avoid overshooting the roadway as vehicle 100 travels from roadway 300 to roadway 302.

Virtual repelling nodes 410*a*-410*f* and the Bezier curve 411 formed by them may generate virtual repelling fields, as illustrated by the arrows emanating from virtual repelling nodes 410*a*-410*f* and Bezier curve 411 formed by them. Virtual repelling nodes 412*a*-412*d* and the Bezier curve 413 formed by them may also generate virtual repelling fields, as illustrated by the arrows emanating from virtual repelling nodes 412*a*-412*d* and Bezier curve 413 formed by them. On the other hand, virtual attracting nodes 414*a*-414*f* and the Bezier curve 415 formed by them may generate virtual attracting fields, as illustrated by the arrows directed toward virtual attracting nodes 414*a*-414*f* and Bezier curve 415 formed by them.

Output of block 208 (FIG. 3) may be a net "field" (the "Net Potential Field") that represents the attractive or repulsive "potential" of the attracting and repelling nodes and the attractive and repelling Bezier curves. The potential is a measure of the virtual force generated by the attracting and repelling nodes on vehicle 100. The weighted "cost" related to this potential (the "Potential Field Cost") is calculated at block 210 for use in Model Predictive Controller 206.

Model Predictive Controller 206 may be a discrete digital controller, operating at a control interval or period "k". The controller has a curve 250 that represents the reference trajectory for vehicle 100. Model Predictive Controller 206 calculates a cost function V as the summation of a number of cost terms, as:

$$V = \frac{1}{2}\sum_{k=1}^{p}\left\{(y - y_{ref})^2 W_y + (u - u_{ref})^2 W_u + (u_k - u_{k-1})^2 W_{\Delta u} + \epsilon^2 W_\epsilon + \gamma^2 W_\gamma\right\},$$

where y is/are variables based on the motion of vehicle 100 (that is, the "outputs");

$y_{ref}$ is/are reference states pertaining to the target path of vehicle 100;

u is/are the inputs to the vehicle trajectory control system;

$u_{ref}$ is/are the precalculated input reference to the model predictive controller, that is, the input that would lead to outputs tracking the references based on feedforward calculations;

ε is a step function that indicates whether any "soft" constraints would be violated by a given control action;

γ is the net virtual strength of virtual attracting nodes, virtual repelling nodes, and Bezier curves;

$W_y$ is the weight assigned to the outputs;

$W_u$ is the weight assigned to the inputs;

$W_{\Delta u}$ is the weight assigned to the rate at which the inputs change;

$W_\epsilon$ is the weight assigned to violation of "soft" constraints;

Wγ is the weight assigned to the potential field of virtual attracting nodes, virtual repelling nodes, and Bezier curves; and p is the prediction horizon.

In the equation for cost function V, y and $y_{ref}$ may be 4×1 matrices, where the variables in the matrices are lateral position, lateral rate, rotational position and rotational rate of vehicle 100. u may be a scalar, namely steering angle input command provided to actuator(s) 122.

The term $(u_k - u_{k-1})^2$ reflects the rate at which the steering angle changes. This term is included in the cost function V as a reflection that less "twitching" in the steering of vehicle 100 may be desirable.

"Soft" constraints may be constraints that may be disadvantageous to violate, such as coming within a predetermined distance of a roadway edge or a lane demarcation without actually crossing the roadway edge or demarcation. "Soft" constraints are constraints that are preferable, but not necessary, not to violate and therefore are included among the other factors in calculating the cost function V. On the other hand, "hard" constraints may include crossing a roadway edge or a lane demarcation. If a control solution cannot be found that will not violate a "hard" constraint, the system may return steering control to manual from autonomous. Another example of the relationship between a soft and a hard constraint may be that a hard constraint may be imposed that vehicle 100 shall not come within a predetermined distance (say, five feet) of a particular obstacle; a related soft constraint may be that vehicle 100 shall not come within a larger predetermined distance (say, ten feet) of the obstacle.

The various W terms in the preceding equation are weighting terms that may be constants. They may be assigned based on calibration of the system in order to achieve the system performance desired.

In Model Predictive Controller 206, curve 250 shows the reference trajectory of vehicle 100. Curve 252 is the actual output reflecting the trajectory of vehicle 100 up to time "k", and curve 254 is the predicted output that reflects the predicted trajectory of vehicle 100. (Arrow 251 and arrow 253 denote time before and after time "k", respectively.)

Curve 256 is the past control input and curve 258 is the projected control input to cause vehicle 100 to converge to the reference trajectory. After calculating the minimum cost V over the prediction horizon and the inputs (curve 258) that would be predicted to result in the minimum cost, Model Predictive Controller 206 applies the first input $u_k+1$ accordingly. Model Predictive Controller 206 then recalculates the minimum cost V over an incremented prediction horizon and again applies the first input from that calculation, and the process continues.

Model predictive control works with constraints. The constraints 212 within which Model Predictive Controller 206 may work are illustrated in detail in FIG. 3A. There, $n_u$ represents the length of the control horizon;

$n_p$ represents the length of the prediction horizon;

$u_{min}$ and $u_{max}$ represent the minimum and maximum input constraints, respectively;

$y_{min}$ and $y_{max}$ represent the minimum and maximum output constraints, respectively;

$\varepsilon$ represents the aforementioned step function regarding soft constraints; and $A_{min}$ and $A_{max}$ represent programmable parameters.

Calculation of overall field strength based on virtual attracting Bezier curves (that is, Bezier curves constructed based on virtual attracting nodes) and virtual repelling Bezier curves (that is, Bezier curves constructed based on virtual repelling nodes) may be as follows. A virtual attractive force $\gamma_A$ may be calculated as $\gamma_A = y_{B_T} - y$, where $y_{B_T}$ is the position of the virtual attracting Bezier curve and y is the position of vehicle 100 in the x-y coordinate set (y being a lateral direction relative to vehicle 100 and x being a longitudinal direction defined by vehicle 100). That is, the virtual attractive force is greater when vehicle 100 is further away from the virtual attracting Bezier curve. (The force may be scaled based on the strengths of the respective attracting nodes that form the basis of the Bezier curve.) A virtual repelling force $\gamma_R$, on the other hand, may be:

$$\gamma_R = \begin{cases} \dfrac{1}{y_{B_L} - y}, & y < 0 \\ \dfrac{1}{y_{B_R} - y}, & y \geq 0 \end{cases}$$

That is, the virtual repelling force may be greater when vehicle 100 is nearer a virtual repelling Bezier curve. The force may be scaled based on the strengths of the respective repelling nodes that form the basis of the Bezier curve.

Thus, the overall cost based on the potential fields for any longitudinal position of vehicle 100 may be as follows:

$$\gamma = \frac{\gamma_A}{\gamma_R} = \begin{cases} \dfrac{y_{B_T} - y}{y_{B_L} - y}, & y < 0 \\ \dfrac{y_{B_T} - y}{y_{B_R} - y}, & y \geq 0 \end{cases}$$

Costs $\gamma$ attributable to the virtual attracting and virtual repelling nodes can similarly be calculated according to the lateral distance y of vehicle 100 from the virtual attracting and virtual repelling nodes. (The virtual attracting and virtual repelling forces may be scaled based on the strength of the respective virtual attracting and virtual repelling nodes.) Those costs may similarly be added. All of the costs $\gamma$ may then be summed to provide a total cost attributable to the virtual attracting and virtual repelling nodes and virtual attracting and virtual repelling Bezier curves to be used in the calculation of V by Model Predictive Controller 206.

Refer now to FIG. 6. There, the use of a Comfort Mode, a Transition Mode and a Precision Mode is shown. In this example, vehicle 100 may be on a roadway 500 and intend to stay on roadway 500, rather than turn via a fork 501 onto a roadway 502. As vehicle 100 travels on a stretch 504 of roadway 500 in advance of fork 501, vehicle 100 may be controlled in Comfort Mode. The location of virtual repelling nodes and the resultant Bezier curves 506 and 508 may be relatively widely spaced apart, because precision control and the comparative harshness that may entail may not be as beneficial on a stretch of roadway with no intersections and no obstacles. However, as vehicle 100 approaches fork 501, it may be more important for vehicle 100 to avoid straying toward roadway 502. Therefore, a Transitional Mode may be entered for roadway stretch 509, where the Bezier curve 510 on the right (that is, toward the fork) is tighter toward the intended path of vehicle 100 than Bezier curve 512 on the left. As such, the controller (i.e., the path planner) may impose asymmetric error constraints or asymmetric error boundaries. In this instance, the controller imposes a comfort trajectory on the left and a precision trajectory on the right. Further then, in roadway stretch 514, Bezier curve 516 and Bezier curve 518 may be relatively more tightly disposed (that is, closer together), in Precision Mode. Finally, the behavior may go back to default Comfort Mode. At that point, Bezier curve 520 and Bezier curve 522 may again be spaced relatively farther apart, entering Comfort Mode, owing to the fact that vehicle 100 is no longer travelling on a road segment where particularly precise control may be advantageous.

Additionally or alternatively, a Precision Mode may be reflected by increasing the number of control points to which the trajectory of vehicle 100 may be controlled. In the case of the use of model predictive control, that may be accomplished by increasing the bandwidth of the digital control involved. Added precision for driving maneuvers or locations that would benefit from the added precision may come at the expense of more harshness imposed by the more precise control. A Comfort Mode may be reflected by using fewer control points, and a Transition Mode by a number of control points between Precision Mode and Comfort Mode.

A Precision Mode or a precision trajectory may be used, for instance, in areas of an impending steering maneuver of the vehicle, an impending road intersection, an impending road ramp, nearby obstacles (such as, say, other vehicles), or a construction zone, where precision control of the trajectory of vehicle 100 may be advantageous.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure.

Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims. Moreover, this disclosure expressly includes combinations and sub-combinations of the elements and features presented above and below.

What is claimed is:

1. A method for controlling a vehicle, the method comprising:
through one or more controllers:
determining an intended driving path of the vehicle;
determining locations of virtual attracting nodes on the intended driving path;
determining locations of virtual repelling nodes along one or more boundaries spaced from the intended driving path;
calculating virtual attractive forces between one or more positions of the vehicle and the virtual attracting nodes;
calculating virtual repelling forces between one or more positions of the vehicle and the virtual repelling nodes;
controlling a trajectory of the vehicle at least in part using the virtual attractive forces and the virtual repelling forces; and
controlling the trajectory of the vehicle using a Comfort Mode and a Precision Mode, each of Comfort Mode and Precision Mode using control points, wherein in Precision Mode, a larger number of control points is used than in Comfort Mode.

2. The method of claim 1, further comprising assigning different weights to different virtual attracting nodes, the different weights representing different virtual attractive forces generated by the different virtual attracting nodes.

3. The method of claim 2, further comprising assigning different weights to different virtual repelling nodes, the different weights representing different virtual repelling forces generated by the different virtual repelling nodes.

4. The method of claim 3, wherein at least some of the virtual repelling nodes are constructed as circles, radii of the circles representing the weights of the at least some virtual repelling nodes.

5. The method of claim 4, wherein at least some of the virtual repelling nodes that are constructed as circles are located at obstacles for the vehicle to avoid.

6. The method of claim 1, further comprising:
using the virtual attractive forces and the virtual repelling forces to determine a cost;
wherein controlling a trajectory of the vehicle further includes using the cost in a model predictive controller that controls the trajectory of the vehicle;
wherein the cost is further determined using a step function that indicates whether a soft constraint would be violated by a given control action; and
wherein the soft constraint is coming within a predetermined distance of a roadway edge.

7. The method of claim 1, further comprising using Precision Mode in a construction zone.

8. A method for controlling a vehicle, the method comprising:
through one or more controllers, determining an intended driving path of the vehicle;
through one or more controllers, determining locations of first virtual repelling nodes along a first boundary spaced from the intended driving path;

through one or more controllers, determining locations of second virtual repelling nodes along a second boundary spaced from the intended driving path;
through one or more controllers, using at least some of the first virtual repelling nodes to generate a first virtual repelling curve;
through one or more controllers, using at least some of the second virtual repelling nodes to generate a second virtual repelling curve;
through one or more controllers, calculating first virtual repelling forces between one or more positions of the vehicle and the first virtual repelling curve;
through one or more controllers, calculating second virtual repelling forces between one or more positions of the vehicle and the second virtual repelling curve;
through one or more controllers, steering the vehicle at least in part using the first virtual repelling forces and the second virtual repelling forces; and
steering the vehicle using a Comfort Mode and a Precision Mode, wherein in Precision Mode, the first virtual repelling curve and the second virtual repelling curve are located more closely together than in Comfort Mode.

9. The method of claim 8, further comprising:
through one or more controllers, determining locations of virtual attracting nodes on the intended driving path;
through one or more controllers, using at least some of the virtual attracting nodes to generate a virtual attracting curve;
through one or more controllers, generating virtual attractive forces between one or more positions of the vehicle and the virtual attracting curve; and
through one or more controllers, steering the vehicle at least in part using the first virtual repelling forces, the second virtual repelling forces, and the virtual attractive forces.

10. The method of claim 8, further comprising steering the vehicle using asymmetric error boundaries in which the first virtual repelling curve is closer to one side of the vehicle than the second virtual repelling curve is to a second side of the vehicle.

11. The method of claim 9, wherein the first virtual repelling curve, the second virtual repelling curve and the virtual attracting curve are Bezier curves.

12. The method of claim 8, wherein the first virtual repelling curve and second virtual repelling curve are Bezier curves.

13. The method of claim 8, further comprising using Precision Mode in areas of an impending steering maneuver of the vehicle, an impending road intersection, an impending road ramp, a construction zone, or an area of relatively high traffic.

14. A vehicle comprising:
one or more steered wheels; and
one or more electronic controllers programmed to control the steered wheels and collectively programmed with the following instructions:
determine an intended driving path of the vehicle;
determine locations of virtual attracting nodes on the intended driving path;
determine locations of virtual repelling nodes along one or more boundaries spaced from the intended driving path or located at obstacles near the intended driving path;
calculate virtual attractive forces between one or more positions of the vehicle and the virtual attracting nodes;

calculate virtual repelling forces between one or more positions of the vehicle and the virtual repelling nodes;

control the steered wheels at least in part using the virtual attractive forces and the virtual repelling forces; and use the virtual attractive forces and the virtual repelling forces to determine a cost, the cost further determined by a rate of change of a steering angle of the vehicle; wherein the instruction to control the steered wheels further includes an instruction to use the cost in a model predictive controller that controls the steered wheels.

15. The vehicle of claim 14, further comprising one or more controllers collectively programmed with the following instruction:

assign different weights to different virtual attracting nodes, the different weights representing different virtual attractive force generated by the different virtual attracting nodes.

16. The vehicle of claim 14, further comprising one or more controllers collectively programmed with the following instruction:

assign different weights to different virtual repelling nodes, the different weights representing different virtual repelling force generated by the different virtual repelling nodes.

17. The vehicle of claim 16, wherein at least some of the virtual repelling nodes are constructed as circles, radii of the circles representing the weights of the at least some virtual repelling nodes.

18. The method of claim 1, further comprising assigning different weights to different virtual repelling nodes, the different weights representing different virtual repelling forces generated by the different virtual repelling nodes.

19. The method of claim 1, wherein at least some of the virtual repelling nodes are constructed as circles, radii of the circles representing the weights of the at least some virtual repelling nodes.

20. The method of claim 19, wherein at least some of the virtual repelling nodes that are constructed as circles are located at obstacles for the vehicle to avoid.

* * * * *